United States Patent [19]

Byrne

[11] 4,402,229
[45] Sep. 6, 1983

[54] CABLE TENSION MEASURING APPARATUS

[75] Inventor: Paul Byrne, Plano, Tex.

[73] Assignee: Core Laboratories, Inc., Dallas, Tex.

[21] Appl. No.: 284,485

[22] Filed: Jul. 17, 1981

[51] Int. Cl.³ .............................................. G01L 5/10
[52] U.S. Cl. .............................................. 73/862.39
[58] Field of Search ...................... 73/862.39, 826, 827, 73/828, 829, 830, 831, 832, 833, 834, 835, 836, 837; 254/269, 270

[56] References Cited

U.S. PATENT DOCUMENTS

| | | | |
|---|---|---|---|
| 2,376,037 | 5/1945 | Davies et al. | 73/862.42 |
| 2,645,121 | 7/1953 | Scott | 73/862.48 X |
| 2,809,518 | 10/1957 | Grandstaff | 73/862.47 |
| 2,867,411 | 1/1959 | Simmonds et al. | 254/273 |
| 2,931,628 | 4/1960 | Simmonds et al. | 254/273 |
| 2,988,915 | 6/1961 | Knight et al. | 73/862.48 X |
| 3,104,864 | 9/1963 | Melton et al. | 254/273 |
| 3,176,510 | 4/1965 | Kimmell et al. | 73/862.45 |
| 3,265,359 | 8/1966 | Bowden | 254/273 |
| 3,436,962 | 4/1969 | Laws | 73/862.39 |
| 3,532,163 | 10/1970 | Ecuer | 254/273 |
| 3,662,596 | 5/1972 | Siefert | 73/862.39 |
| 3,743,429 | 7/1973 | Van Daalen | 254/273 |
| 3,759,489 | 9/1973 | Jones | 254/273 |
| 3,914,991 | 10/1975 | Fletcher et al. | 73/826 |
| 4,046,355 | 9/1977 | Martin | 254/273 |

Primary Examiner—Jerry W. Myracle
Attorney, Agent, or Firm—Lee C. Robinson, Jr.

[57] ABSTRACT

Apparatus for measuring the tension on a cable. A strain bridge with connective end sections and a central flexible web section is clamped to the cable. Any increase in the tension on the cable causes the end sections to separate slightly, elongating the web section. Attached to the web section are strain gauges, which detect the elongation of the web section. An electronic circuit receives the output of the strain gauge and produces an indication of the desired tension.

10 Claims, 10 Drawing Figures

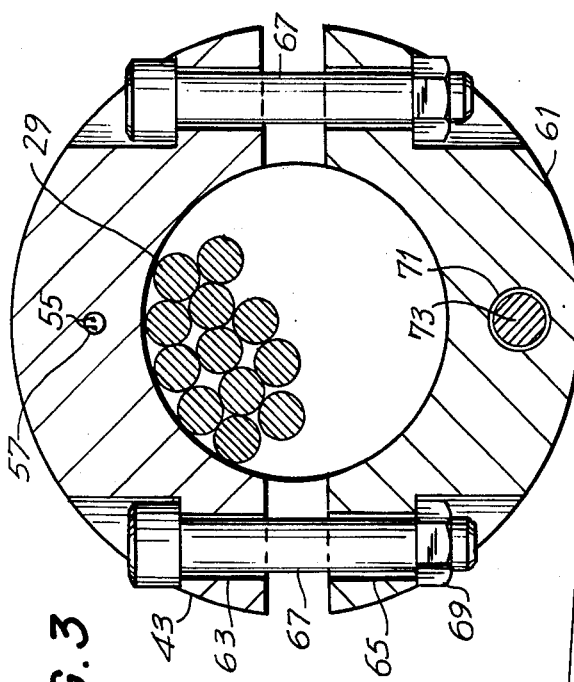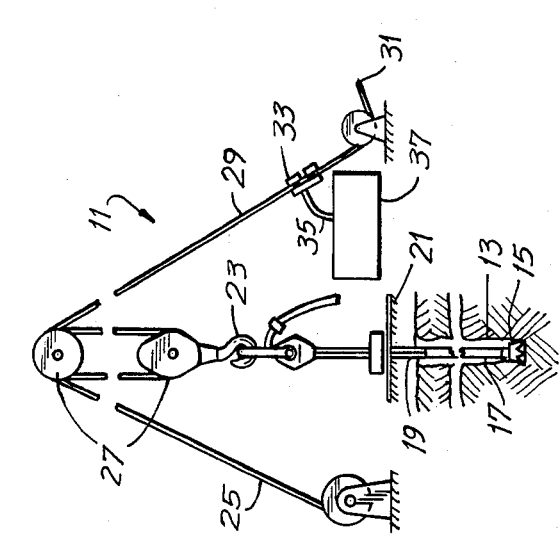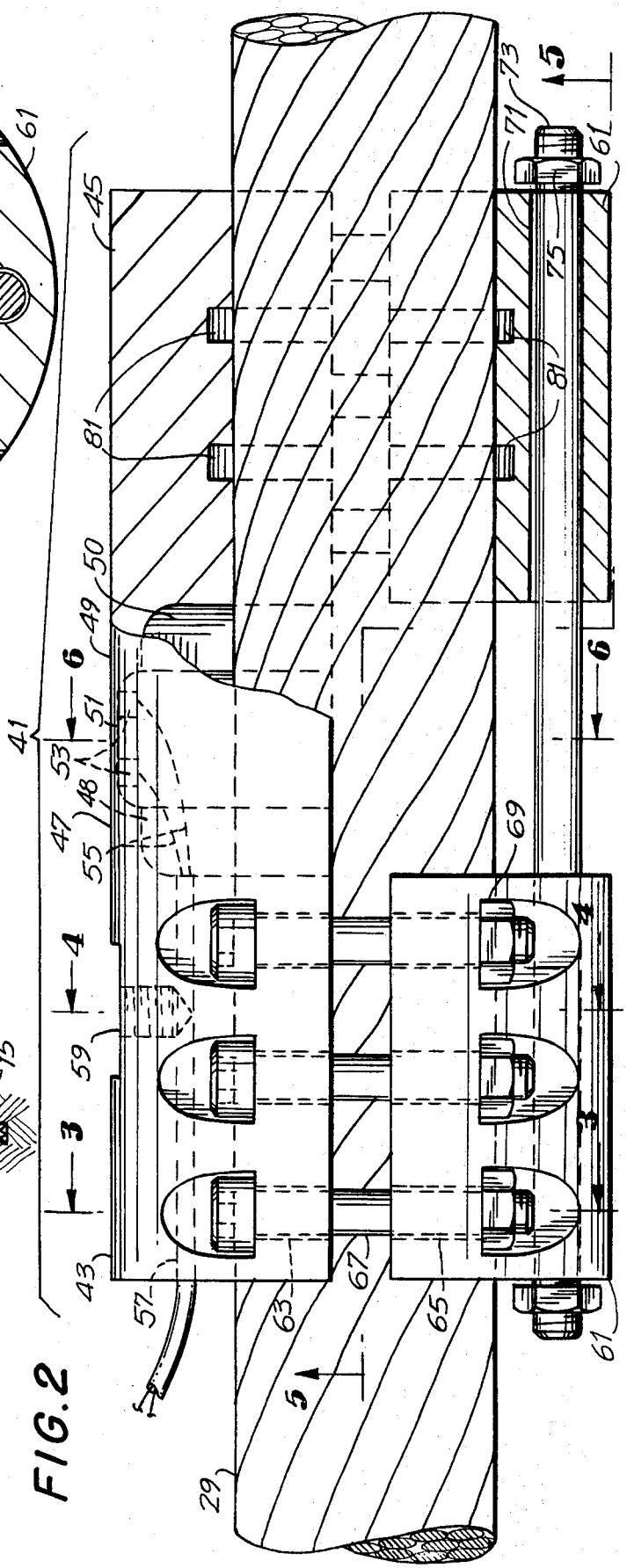

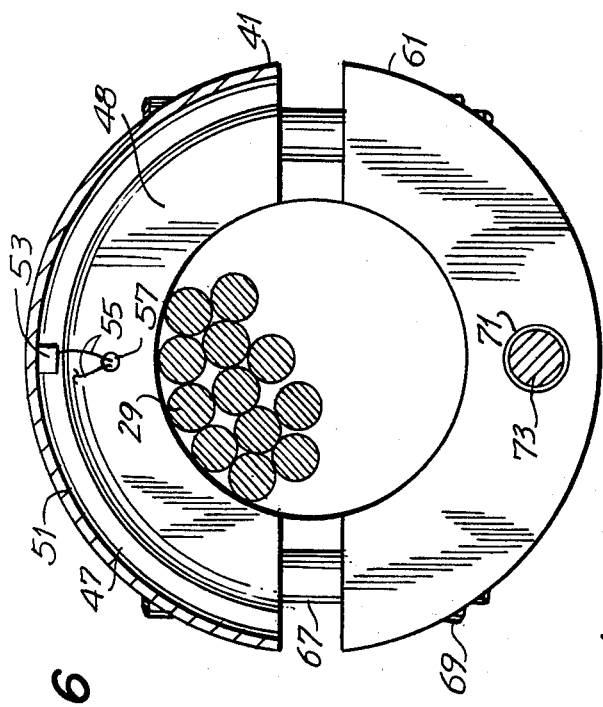
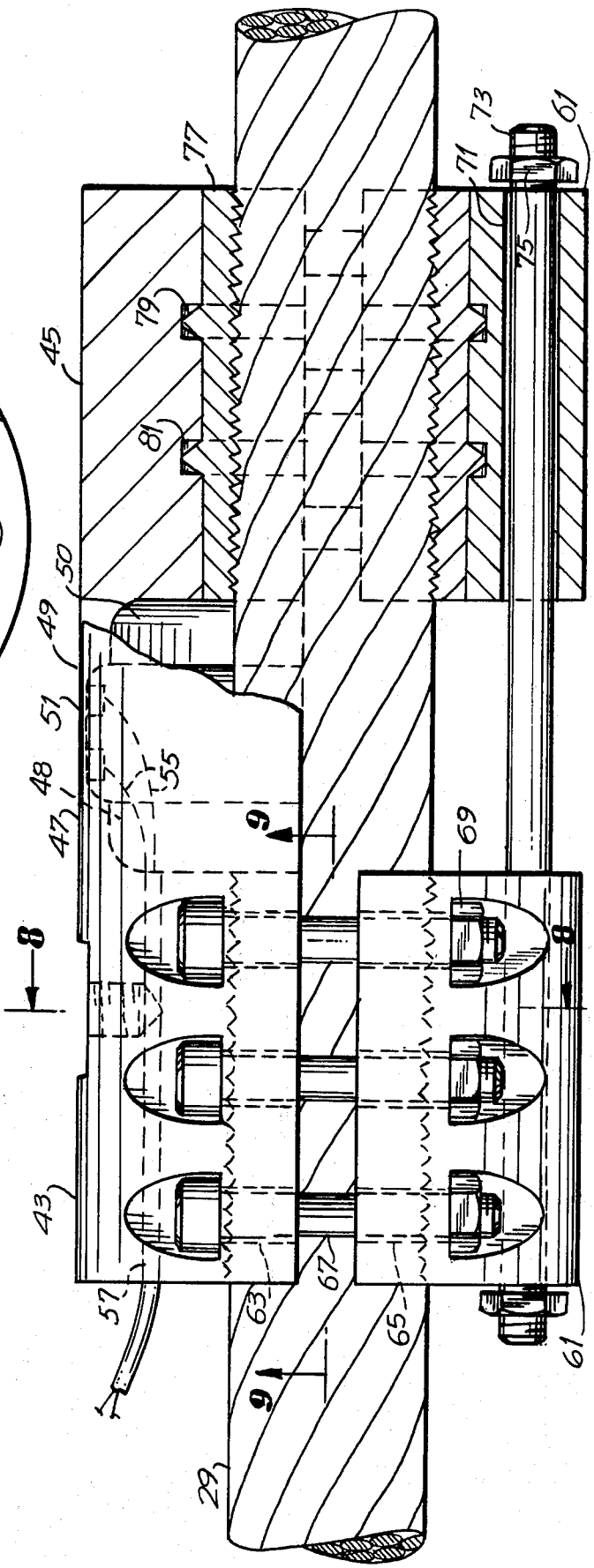
FIG. 6
FIG. 7

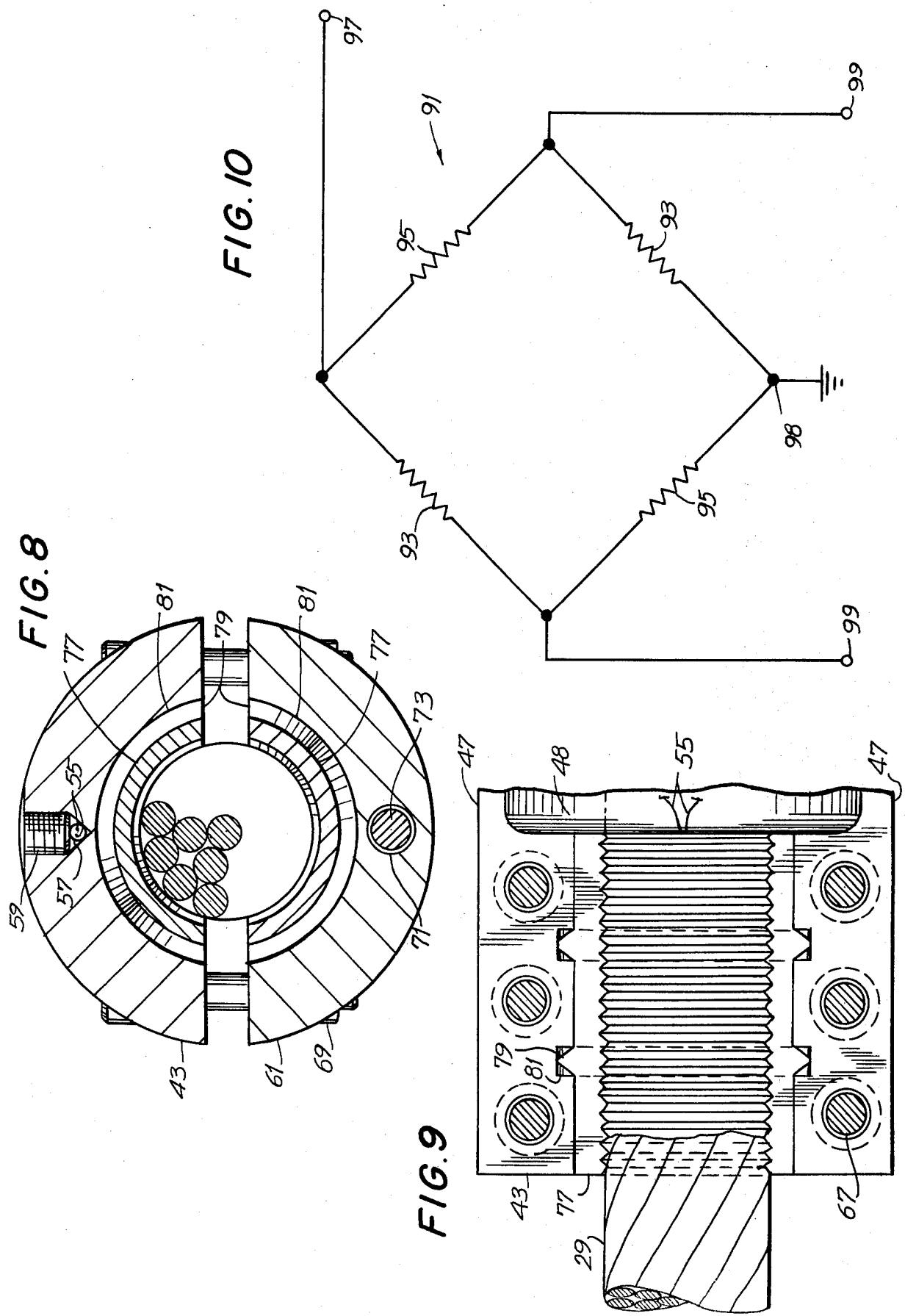

CABLE TENSION MEASURING APPARATUS

BACKGROUND OF THE INVENTION

This invention relates to measuring apparatus, and more particularly to apparatus for measuring the tension on a cable.

The present invention is of general application where it is desired to measure the degree of strain, or stretching, of a cable, chain, conduit, or similar object, due to a tension or stress on the object. It is particularly well suited for use in monitoring the tension on the drilling cable from which the drill string is suspended in a rig for drilling oil and gas wells, and thereby measuring the weight bearing on the drill bit.

In the rotary drilling of oil and gas wells, the drill bit is mounted at the lower end of a column of drill pipe, the drill string. The drill string is rotated by means of a square section of pipe at the top of the drill string, the "kelly", which passes at the surface through a square opening in a rotary table, which in turn is rotated by a suitable engine. The entire drill string is raised and lowered by means of a cable and associated tackle, driven by draw works.

In order to ensure straight and efficient cutting by the drill bit and avoid damage to the bit or pipe column, it is desirable to control the pressure on the drill bit by suspending part of the weight of the drill string from the drilling cable. The operator detects changes in the weight on a weight indicator, and operates the draw works to take up an appropriate portion of the weight.

Attempts have been made heretofore to provide such a weight indicator. One common type of prior apparatus for this purpose kinks or deflects a portion of the deadline, which is the anchored end of the drilling cable, so that the tension on the cable tends to straighten the misaligned portion. The straightening force is sensed by a diaphragm and transmitted hydraulically to the location of the operator.

In another form of sensor, yokes are secured to the cable and then drawn together by connectors running between arms attached to the yokes, thus removing the entire load from the section of the cable between the yokes and causing a kink in the cable. The tension is sensed by mechanical or hydraulic means forming part of the connectors.

These devices have the disadvantage, however, of undue complexity, and fail to take advantage of modern electrical technology, such as strain gauges. Further, when a kink or deflection is put in the deadline, an unnecessary stress is placed on the material of the cable, hastening metal fatigue and ultimate breakage. Also, the supporting arms of the load-bearing connectors of some of the devices are subject to substantial angular stresses, impairing their reliability. Finally, hydraulic devices are subject to inaccuracy caused by temperature changes.

OBJECTS AND SUMMARY OF THE INVENTION

One general object of the invention, therefore, is to provide new and improved apparatus for measuring the tension in a cable, which places no undesirable stresses on the cable by kinking or deflecting it.

A further object is to provide apparatus that does not require that the load be taken off a section of the cable by connectors held by arms at a distance from the cable.

Another object is to improve the temperature-independence of the tension measurements.

A further object is to make use of strain gauges in sensing the tension and transmitting the information to the operator.

In an embodiment of the present invention, the apparatus includes a unitary strain bridge, having connective sections at its ends to attach to the cable and a more flexible central web section joining them. Affixed to the web section is at least one strain gauge, whose electrical resistance varies in proportion to the stress on the web section. Wires connect the strain gauge to a conventional combination of a Wheatstone bridge and other suitable circuitry, which produces a signal representing the tension.

The strain bridge is affixed to the cable by means of the clamp sections at its ends, when the cable is under any initial degree of stress. When an increase in the tension occurs, the increase is reflected in a stretching of the cable, which increases the separation of the clamps. Because the clamps are fixed to the cable, the result is a stretching of the web section, which is sensed by the strain gauges, whose output is processed to yield an indication of the change of tension in the cable.

The desired embodiment has the advantages of a minimal number of parts and easy installation and operation, without deformation of the cable. Further, the elasticity modulus of steel, on which the operation of this embodiment is based, is less temperature-dependent than is the operation of the hydraulic devices of the prior art.

The present invention, as well as further objects and advantages thereof, will be understood more clearly and fully from the following description of certain embodiments, when read with reference to the accompanying drawings.

BRIEF DESCRIPTION OF THE DRAWINGS

FIG. 1 is a schematic representation showing measuring apparatus according to one illustrative embodiment of the invention, together with a portion of a drilling rig.

FIG. 2 is an enlarged side elevational view of the measuring apparatus of FIG. 1, with certain portions shown broken away and in section.

FIGS. 3, 4, 5, and 6 are cross-sectional views taken along lines 3—3, 4—4, 5—5, and 6—6 of FIG. 2, respectively.

FIG. 7 is an enlarged, partially cut-away elevational view similar to FIG. 2, but showing measuring apparatus in accordance with another illustrative embodiment of the invention.

FIGS. 8 and 9 are cross-sectional views taken along lines 8—8 and 9—9 of FIG. 7, respectively.

FIG. 10 is a simplified schematic diagram of a portion of the electrical circuit for determining the desired output of measuring apparatus according to the embodiments of FIGS. 1-9.

DESCRIPTION OF THE DISCLOSED EMBODIMENTS

Figure 4:
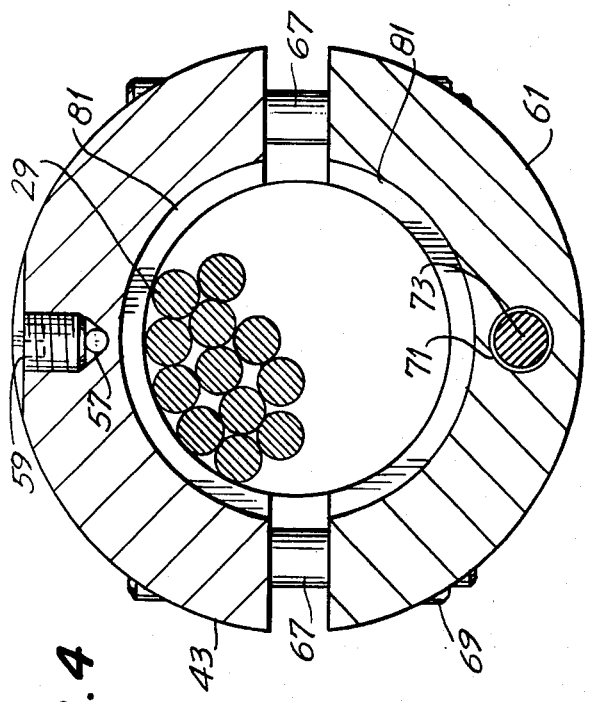

Referring to FIG. 1 of the drawings, there is seen a simplified representation of a drilling rig 11, in which a hole 13 is being drilled by a drill bit 15 at the lower end of a drill string 17. A square section of pipe 19 at the top of the drill string, known as the kelly, passes through a square opening in a rotary table 21 at the surface. The table 21 is rotated by a suitable engine (not shown), thus rotating the drill string and drilling the hole.

The drill string 17 is raised and lowered by a hook 23 suspended from a cable 25 and pulleys 27. The cable 25 is payed out and reeled in by suitable mechanical draw works (not shown). One end 29 of the cable, known as the deadline, is anchored to the earth or another fixed object at a point 31.

Affixed to the deadline 29 for the purpose of measuring the tension therein is an embodiment of the measuring apparatus of the present invention, represented in FIG. 1 by the reference character 33. Connected to the apparatus 33 by wires 35 is a box 37 containing the electrical circuitry and an appropriate visual display or other read-out device for the embodiment.

Figure 5:
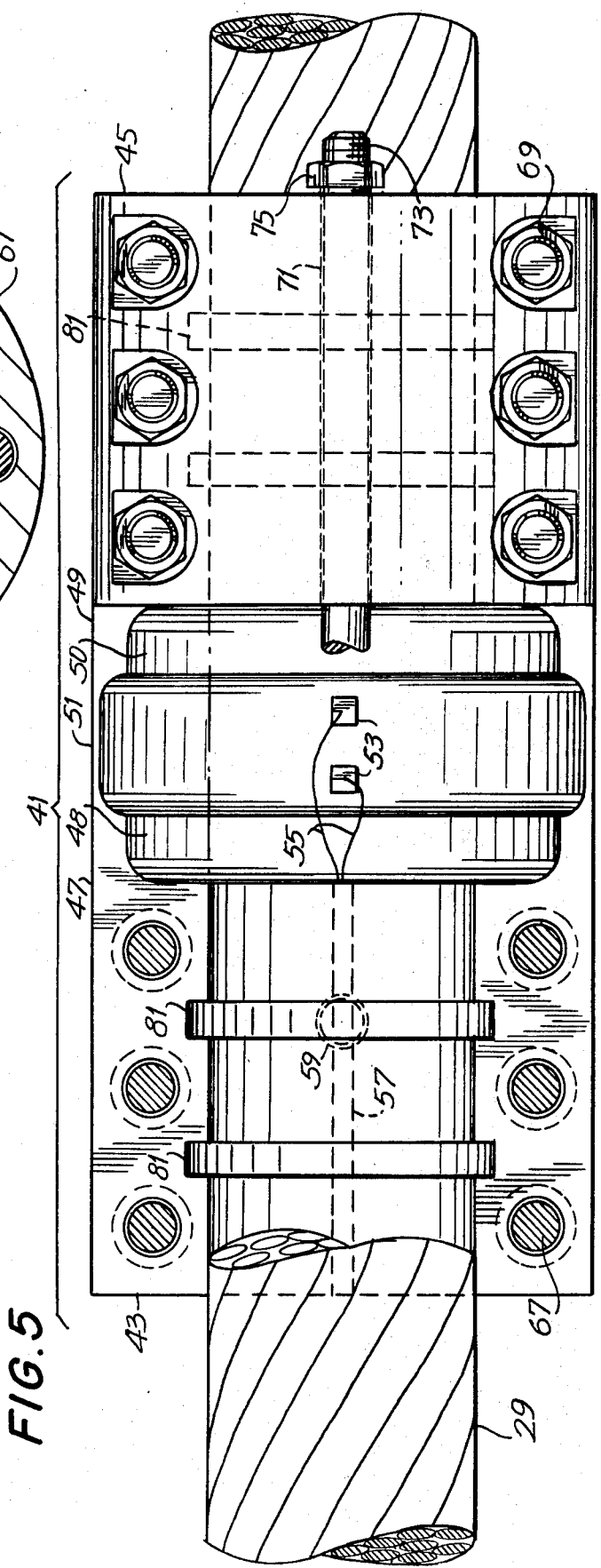

Referring now to FIGS. 2-6, there will be seen views of the apparatus in accordance with one embodiment of the invention. A strain bridge 41, in the general shape of a longitudinal section of a cylinder, is laid along one side of the deadline 29, the cylindrical inner surfaces of the bridge at its first end section 43 and second end section 45 being shaped to fit the outer surface of the cable 29. Each end section is of a length approximately 30 to 40 percent of that of the entire strain bridge. Immediately next to the end sections 43 and 45, respectively, toward the middle of the strain bridge 41, are first and second shoulder sections 47 and 49. The cylindrical surface of the strain bridge inward of the shoulder sections has a greater inner diameter than that of the end sections, so that the shoulder sections enclose annular spaces 48 and 50 between the shoulder sections 47 and 49, respectively, and the cable 29. The radial thickness of the shoulder sections is about one-fourth that of the end sections.

Lying between the shoulder sections 47 and 49 of the strain gauge is a central web section 51, of which the inner diameter is substantially greater than that of the shoulder sections, and the annular space enclosed by the web section is similarly larger as well. The increase in inner diameter makes the web section sufficiently thin that its modulus of elasticity is at least as great as that of the cable, and is substantially greater than that of the end and shoulder sections. The longitudinal dimension of the web in this embodiment is approximately twice that of each shoulder.

Attached to the inner surface of the web 51 in the pictured embodiment are two strain gauges 53, situated symmetrically on an imaginary longitudinal line on the inner cylindrical surface of the web halfway between the sides of the bridge 41. Lead wires 55 are connected to the strain gauges 53 for transmitting their output. These wires extend from the strain gauges to the exterior of the strain bridge through an opening 57 which is located along the aforementioned longitudinal line approximately one-half the radial distance between the inner and outer surfaces of first end section 43, running from the first annular space 48, through first end section 43, and exiting from its end. An additional opening 59 is provided between the opening 57 and the approximate midpoint of the outer surface of the first end section 43 as an alternate passage for the wires 55.

The strain bridge 41, lying along one side of the deadline 29, is held thereon by two clamps 61 on the opposite side of the deadline in diametrically opposed relation to the end sections 43 and 45. The clamps 61 have the shape of longitudinal sections of a cylinder, of substantially the same radial thickness and length as the end sections of the strain bridge. Three holes 63 are provided along each side of each end section, and three matching holes 65 are provided along each side of each clamp, permitting bolts 67, secured by nuts 69, to link the end portions to the clamps, skirting the cable.

A longitudinal opening 71 is provided in each clamp 61, centrally located between the sides of the clamp and about halfway between the inner and outer surfaces. A shaft 73, threaded on both ends, is inserted through the openings 71 in both clamps 61. The shaft 73 is of sufficient length that the threaded ends project beyond the ends of the clamps, where they are loosely secured by nuts 75.

An additional feature of the disclosed embodiment, illustrated in FIGS. 7-9, provides inserts 77 to allow the apparatus to be used with a size of cable substantially smaller than that for which the inner curvature of the strain bridge 41 is designed. Inserts 77 are in the general shape of lengthwise sections of cylinders, whose outer surfaces match in size and curvature the inner surfaces of end sections 43 and 45 and clamps 61, and whose inner surfaces are fully threaded and shaped to match the surface of the cable intended to be used. One insert is used between the cable and each end section or clamp. Each insert 77 is provided in its outer surface with two ridges 79 oriented circumferentially with respect to the curvature of the insert and symmetrically spaced with respect to its length. The inner cylindrical surface of each end section and each clamp has two circumferential grooves 81 to accommodate the ridges 79.

FIG. 10 represents a portion of the electrical circuit for the apparatus, which is a Wheatstone bridge 91, in which the two strain gauges 53 constitute opposing legs 93, and two known resistances are the other opposing pair of legs 95. A potential is impressed upon the bridge at a terminal 97, and an opposing terminal 98 is grounded. A voltage is detected across two other terminals 99 and is processed to indicate whether the resistance of legs 93 has been altered by a change in the tension on the strain gauges 53.

The operation of the disclosed embodiment is as follows: the strain bridge 41 is laid alongside the deadline cable 29 and is attached thereto by placing the two clamps 61 on the opposite side of the cable from the end sections 43 and 45. Twelve of the bolts 67 are inserted into the twelve pairs of corresponding holes 63 in the end sections and the holes 65 in the clamps, and nuts 69 are then placed on the ends of the bolts. If necessary to accommodate a smaller gauge cable, four inserts 77 are positioned between the cable and each of the end sections and clamps before the bolts are inserted.

When an increase in the tension on the cable 29 causes to cable to stretch slightly, the end sections of the strain bridge 41, being firmly attached to the cable, tend to separate. The web section 51 of the strain bridge is of considerably thinner and more elastic material than the end sections and the transitional shoulder sections, and the section 51 therefore stretches by the same amount.

The electrical resistance of the strain gauges 53, which are mounted on web section 51, changes in proportion to the degree of elongation. This change causes an imbalance in the Wheatstone bridge 91, and the resulting signal is detected and processed by conventional means to provide a readable indication of the tension on the cable or, if desired, the weight of the drill string.

The described embodiment gives substantially better temperature-independence than many of the devices used heretofore for this purpose. Electrical means are inherently less subject to the expansion and contraction effects that adversly affect prior mechanical and hydraulic devices.

In addition, the embodiment measures tension by means of a highly compact and portable unit, again an advantage over prior devices. Although the apparatus has been described and illustrated as having particular utility in the measurement of the weight on the drill bit in an oil or gas well, the invention in its broadest aspects is not limited to this particular application, but rather is useful in any situation in which a tension or elongation of a cable or conduit is to be measured. Indeed, the invention as disclosed is useful for measuring a distance between any two points or objects to which its ends are fixed, regardless of whether the points are on a unitary object such as a cable.

Considering the breadth of usefulness of the invention for measuring distances, the terms and expressions that have been employed herein are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Apparatus for measuring tension on a cable, comprising:
   a strain bridge including at least two clamp means for attachment to the cable and a web portion integrally formed with and extending between the clamp means;
   sensing means affixed to the web means for producing an output signal proportional to the tension thereon; and
   circuit means connected to the sensing means for processing the output signal and for providing a readable output representative of the tension on the cable.

2. Apparatus for measuring tension on a cable, comprising:
   at least two clamp means for attachment to the cable with an initial separation therebetween;
   web means integrally formed with and extending between the clamp means to be placed under tension in response to an increase in the separation between said clamp means;
   sensing means affixed to the web means for producing an output signal proportional to the tension on the web means; and
   circuit means connected to the sensing means for processing the output signal and for providing a readable output representative of the tension on the cable.

3. Apparatus for measuring tension on a cable, comprising:
   a strain bridge having at least two clamp means for attachment to the cable when the cable is under an initial degree of tension and a web integrally formed with and extending between the clamp means whereby the tension on the web increases when an increase occurs in the tension on the cable;
   strain gauge means affixed to the web for producing an output signal proportional to the tension on the web; and
   circuit means connected to the strain gauge means for processing the output signal and for providing a readable output representative of the tension on the cable.

4. Apparatus for measuring tension on a cable, comprising:
   at least two clamp means for attachment to the cable;
   web means extending between the clamp means;
   sensing means affixed to the web means for producing an output signal proportional to the tension thereon, said signal being produced with the cable within and between the clamp means remaining in a substantially unbent and unflexed configuration; and
   circuit means connected to the sensing means for processing the output signal and for providing a readable output representative of the tension on the cable.

5. Apparatus for measuring tension on a cable, comprising:
   at least two clamp means for attachment to the cable;
   web means integral with and extending between the clamp means;
   sensing means affixed to the web means for producing an output signal proportional to the tension thereon, said signal being produced with the cable within and between the clamp means having the same tension thereon as the remainder of the cable; and
   circuit means connected to the sensing means for processing the output signal and for providing a readable output representative of the tension on the cable.

6. Apparatus for measuring tension on a cable, comprising:
   strain bridge means for attachment to the cable, having end sections for attachment to the cable and a web member integral with and extending between the end sections, whereby the tension on the web member is responsive to the tension on the cable;
   clamping means for clamping the respective end sections thereto with said cable being received by the combination of the clamping means and the end sections;
   sensing means affixed to the web member for producing an output signal proportional to the tension on the web member; and
   circuit means connected to the sensing means for processing the output signal and for providing a readable output representative of the tension on the cable.

7. Apparatus as defined in claim 6, wherein the sensing means includes at least one strain gauge.

8. Apparatus for measuring tension on a cable, comprising: strain bridge means for attachment to the cable, having end sections for attachment to the cable and a web member affixed to and extending between the end sections, the end sections and web member of the strain bridge means forming an integral unit and the web member having a modulus of elasticity substantially higher than that of the end sections, whereby the tension on the web member is responsive to the tension on the cable;
   sensing means affixed to the web member for producing an output signal proportional to the tension on the web member; and
   circuit means connected to the sensing means for processing the output signal and for providing a readable output representative of the tension on the cable.

9. Apparatus for measuring tension on a cable, comprising:

support means for attachment to the cable when the cable is under an initial degree of tension, having end portions to be clamped to the cable, and having a web portion joining the end portions, the elasticity modulus of the web portion being at least as great as that of the cable;

sensing means attached to the web portion for producing an output signal responsive to an increase in the tension on the cable; and circuit means connected to the sensing means for processing the output signal and providing a readable output representative of the tension on the cable.

10. Apparatus as defined in claim 9, wherein the support means is attached to the cable and the signal produced without substantially bending or flexing the cable or changing the degree of tension on any part thereof.

* * * * *